United States Patent
Freeman et al.

(10) Patent No.: US 11,226,099 B2
(45) Date of Patent: Jan. 18, 2022

(54) COMBUSTOR LINER FOR A GAS TURBINE ENGINE WITH CERAMIC MATRIX COMPOSITE COMPONENTS

(71) Applicants: Rolls-Royce Corporation, Indianapolis, IN (US); Rolls-Royce North American Technologies Inc., Indianapolis, IN (US)

(72) Inventors: Ted J. Freeman, Danville, IN (US); Aaron D. Sippel, Zionsville, IN (US); Jack D. Petty, Indianapolis, IN (US); Gregory W. Zeaton, Carmel, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 103 days.

(21) Appl. No.: 16/599,751

(22) Filed: Oct. 11, 2019

(65) Prior Publication Data
US 2021/0108798 A1    Apr. 15, 2021

(51) Int. Cl.
*F23R 3/00*    (2006.01)

(52) U.S. Cl.
CPC .................... *F23R 3/007* (2013.01)

(58) Field of Classification Search
CPC .. F23R 3/007; F23R 3/60; F23R 3/002; F23R 2900/00017; F23R 2900/00018; F23M 5/04
See application file for complete search history.

(56) References Cited

U.S. PATENT DOCUMENTS

| | | | |
|---|---|---|---|
| 4,614,082 A | 9/1986 | Sterman et al. | |
| 5,291,732 A * | 3/1994 | Halila | F23R 3/60 60/752 |
| 6,341,485 B1 | 1/2002 | Liebe | |
| 6,397,603 B1 | 6/2002 | Edmondson et al. | |
| 7,043,921 B2 | 5/2006 | Hadder | |
| 7,757,495 B2 | 7/2010 | Bassagnet et al. | |
| 9,423,129 B2 | 8/2016 | Graves et al. | |
| 9,612,017 B2 | 4/2017 | Vetters | |
| 9,879,605 B2 | 1/2018 | Maurer et al. | |
| 2009/0019856 A1 * | 1/2009 | Commaret | F23R 3/04 60/752 |
| 2015/0260401 A1 * | 9/2015 | Gerends | F23R 3/60 60/752 |
| 2016/0016230 A1 * | 1/2016 | Campomanes | C04B 35/6455 264/118 |
| 2016/0169512 A1 * | 6/2016 | Tu | F23R 3/06 60/754 |
| 2016/0215980 A1 | 7/2016 | Chang | |
| 2016/0245518 A1 * | 8/2016 | Drake | F23R 3/002 |
| 2018/0238181 A1 | 8/2018 | Reynolds et al. | |
| 2019/0285276 A1 * | 9/2019 | Porter | F23R 3/06 |

* cited by examiner

*Primary Examiner* — Edwin Kang
(74) *Attorney, Agent, or Firm* — Barnes & Thornburg LLP

(57) ABSTRACT

A combustor adapted for use in a gas turbine engine includes a metallic combustor shell forming an interior space, a heat shield, and a liner arranged in the interior space of the metallic case. The liner defines a combustion chamber in which fuel is burned during operation of a gas turbine engine.

14 Claims, 2 Drawing Sheets

COMBUSTOR LINER FOR A GAS TURBINE ENGINE WITH CERAMIC MATRIX COMPOSITE COMPONENTS

FIELD OF THE DISCLOSURE

The present disclosure relates generally to combustors used in gas turbine engines, and more specifically to a combustor including a metallic case and a liner.

BACKGROUND

Engines, and particularly gas turbine engines, are used to power aircraft, watercraft, power generators and the like. Gas turbine engines typically include a compressor, a combustor, and a turbine. The compressor compresses air drawn into the engine and delivers high pressure air to the combustor. The combustor is a component or area of a gas turbine engine where combustion takes place. In a gas turbine engine, the combustor receives high pressure air and adds fuel to the air which is burned to produce hot, high-pressure gas. After burning the fuel, the hot, high-pressure gas is passed from the combustor to the turbine. The turbine extracts work from the hot, high-pressure gas to drive the compressor and residual energy is used for propulsion or sometimes to drive an output shaft.

Combustors include liners that contain the burning fuel during operation of a gas turbine engine. The liner included in the combustor is designed and built to withstand high-temperatures induced during combustion. In some cases, liners may be made from metallic superalloys. In other cases, liners may be made from ceramic matrix composites (CMCs) which are a subgroup of composite materials as well as a subgroup of technical ceramics. CMCs may comprise ceramic fibers embedded in a ceramic matrix. The matrix and fibers can consist of any ceramic material, in which carbon and carbon fibers can also be considered a ceramic material.

Combustors and turbines made of metal alloys often require significant cooling to be maintained at or below their maximum use temperatures. The operational efficiencies of gas turbine engines are sometimes increased with the use of CMC materials that require less cooling and have operating temperatures that exceed the maximum use temperatures of most metal alloys. The reduced cooling required by CMC combustor liners when compared to metal alloy combustor liners can permit greater temperature uniformity and can lead to reduced undesirable emissions.

One challenge relating to the use of CMC liners is that they are sometimes secured to the surrounding metal shell via metal fasteners. Metal fasteners can lose their strength and may even melt at CMC operating temperatures. Since the allowable operating temperature of a metal fastener is typically lower than the allowable operating temperature of the CMC, metal fasteners, and/or the area surrounding it, is often cooled to allow it to maintain its strength. Such configurations may undermine the desired high temperature capability of the CMC. Accordingly, new techniques and configurations are needed for coupling components, such as CMC, to the walls of enclosures experiencing high-temperature environments.

SUMMARY

The present disclosure may comprise one or more of the following features and combinations thereof.

According to a first aspect of the present disclosure, a combustor for use in a gas turbine engine includes a combustor shell, a heat shield, and a combustor liner. The combustor shell includes metallic materials and is adapted to be mounted in a gas turbine engine and formed to define an interior cavity. The combustor shell includes an outer annular wall that extends circumferentially around a central reference axis, an inner annular wall arranged radially inward from the outer annular wall to provide the interior cavity between the outer annular wall and the inner annular wall, and a dome panel coupled to an axially-forward end of the outer annular wall and the inner annular wall. In some embodiments, the heat shield is coupled to an axially-aft surface of the dome panel and arranged within the interior cavity.

In some embodiments, the combustor liner includes a plurality of liner segments including ceramic matrix composite materials and arranged circumferentially adjacent one another around the central reference axis in the interior cavity to provide a radial boundary of a combustion chamber within the interior cavity. In some embodiments, each liner segment has an axially forward end trapped radially between the combustor shell and the heat shield to establish a radial location of the axially forward end without axial fixation of the axially forward end so as to allow axial movement of each liner segment relative to the combustor shell and the heat shield thereby accommodating thermal growth of each liner segment at a rate not equal to the combustor shell.

In some embodiments, each liner segment has an axial length between the axially-forward end and an axially-aft end and the combustion chamber has an axial length that is substantially equal to the length of each liner segment.

In some embodiments, the combustor shell further includes an aft hanger that is coupled to an inner surface of the combustor shell and extends into the interior cavity to provide a ledge that blocks each tile segment from moving radially into the combustion chamber, the ledge sized selectively to allow the combustion shell to grow thermally and increase the length of the combustion chamber while still retaining each tile segment.

In some embodiments, each tile segment includes a tile body and an aft prong that extends along an axially aft end of the tile body and has an inner radial surface offset from an inner radial surface of the tile body and engaged with the ledge of the aft hanger.

In some embodiments, each liner segment includes a tile body, a first circumferential prong arranged along a first circumferential side of the tile body, and a pair of second circumferential prongs arranged along a second circumferential side of the tile body.

In some embodiments, the tile body has an outer radial surface and an inner radial surface and the first circumferential prong is defined by an outer radial surface that is flush with the outer radial surface of the tile body and an inner radial surface offset from the inner radial surface of the tile body.

In some embodiments, the pair of second circumferential prongs includes an outer prong and an inner prong spaced apart from the outer prong to provide an axially extending channel radially between the outer prong and the inner prong.

In some embodiments, the first circumferential prong has radial thickness that is equal to a distance between an outer radial surface of the inner prong and an inner radial surface of the outer prong defining the axially-extending channel.

In some embodiments, the inner prong has a radial thickness equal to a distance between the inner radial surface of the tile body and the inner radial surface of the first circumferential prong so that the inner radial surface of the tile body of each liner segment is flush with one another when combined to form the combustor liner.

In some embodiments, the combustor shell is formed to include a plurality of cooling holes that open into a cooling cavity formed between each tile segment and the combustor shell and cooling fluid is configured to flow into the cooling cavity and cause a pressure differential between the cooling cavity and the combustion chamber that forces each tile segment into engagement with the heat shield.

In some embodiments, each liner segment has an axially forward end positioned radially between the combustor shell and the heat shield to establish a radial location of the axially forward end without axial fixation of the axially forward end so as to allow axial movement of each liner segment relative to the combustor shell and the heat shield thereby accommodating thermal growth of each liner segment at a rate not equal to the combustor shell.

These and other features of the present disclosure will become more apparent from the following description of the illustrative embodiments.

DETAILED DESCRIPTION OF THE DRAWINGS

Figure 1:
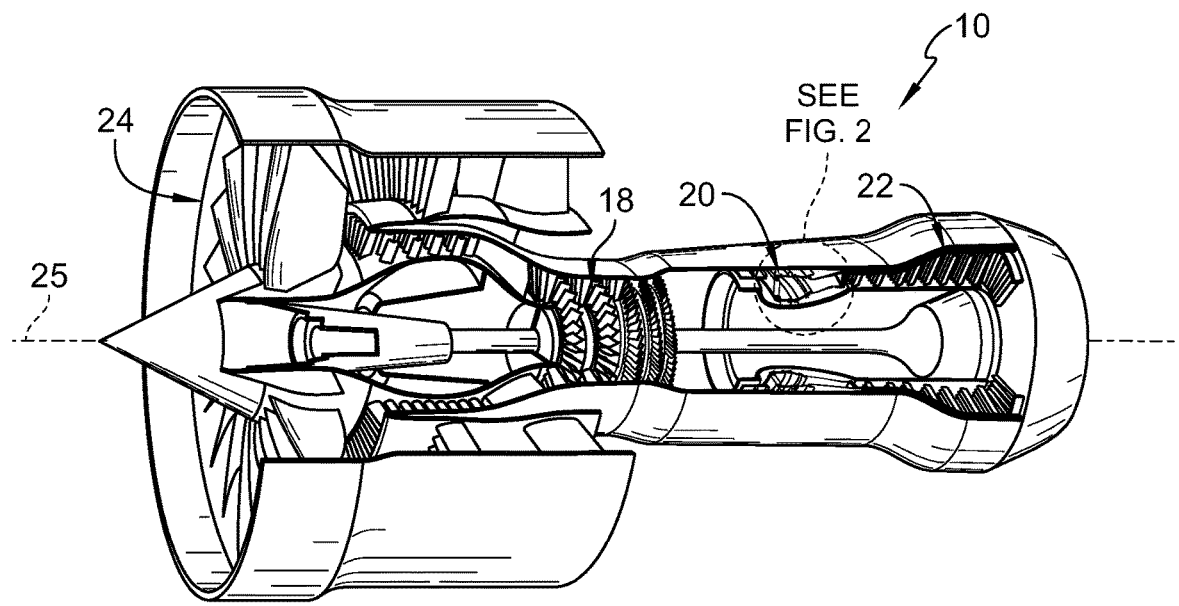
FIG. 1 is a partial perspective view of a gas turbine engine, in accordance with the present disclosure, showing that the gas turbine engine includes a compressor, a combustor, a turbine, and a fan that is driven in rotation about a central reference axis by the turbine upon combustion of fuel and pressurized air in the combustor.

For the purposes of promoting an understanding of the principles of the disclosure, reference will now be made to a number of illustrative embodiments illustrated in the drawings and specific language will be used to describe the same.

A gas turbine engine 10, in accordance with the present disclosure, is shown in FIG. 1. The gas turbine engine 10 includes a compressor 18, a combustor 20, and a turbine 22. The compressor 18 is configured to pressurize air and delivers the pressurized air to the combustor 20 during operation. Fuel is injected in to the combustor 20 and ignited with the pressurized air to produce hot, high pressure gases which are discharged from the combustor 20 toward the turbine 22. The hot, high pressure gases drive rotation of rotating components (i.e. blades and disks) in the turbine 22 about a central reference axis 25 which drives rotation of a fan 24 to provide thrust for the gas turbine engine 10.

Figure 2:
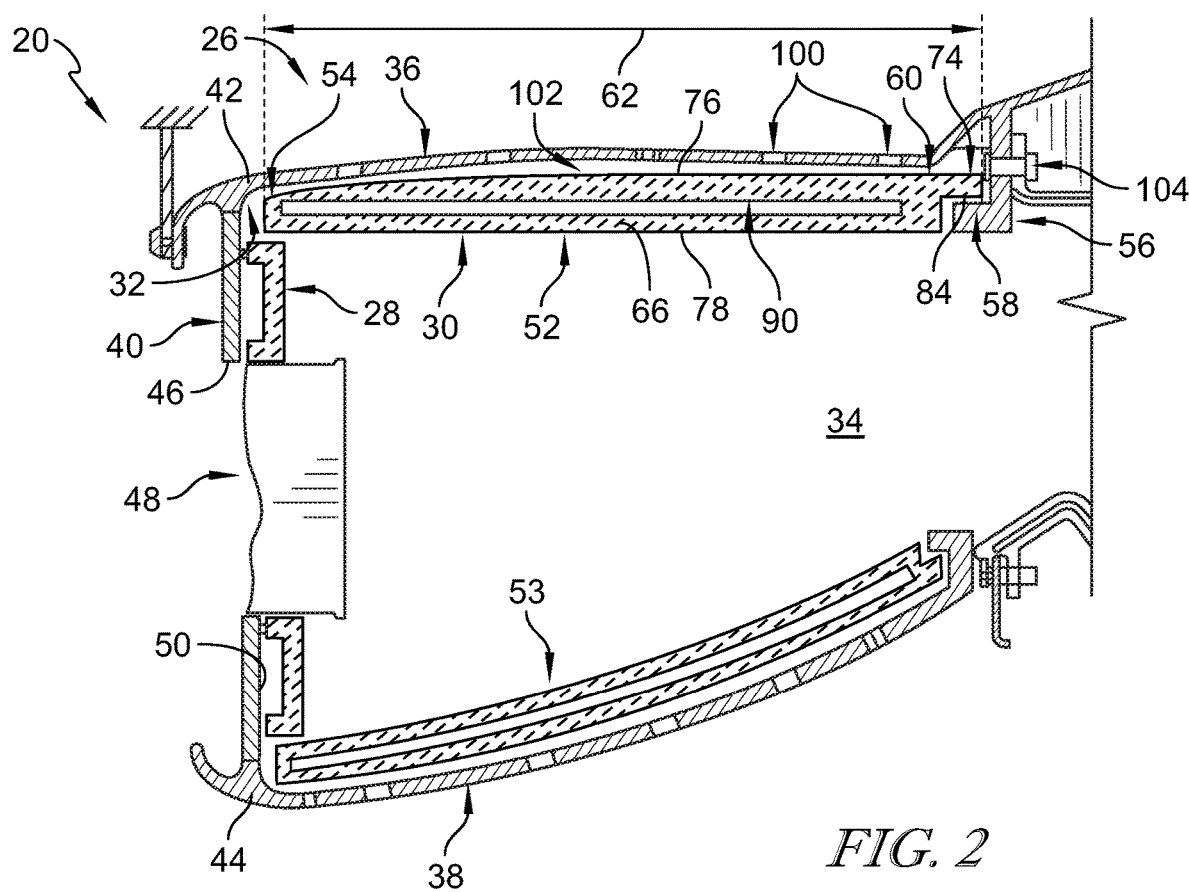
FIG. 2 is an enlarged section view of the combustor from FIG. 1 showing that the combustor includes (i) a combustor shell made from metallic materials and defining an interior cavity, (ii) a heat shield arranged along an axially forward end of the combustor shell, and (iii) a combustor liner comprising a plurality of liner segments made from ceramic matrix composite materials and further showing each liner segment having an axially-forward end trapped between the combustor shell and the heat shield without fixation to the combustor shell so as to float or slide in an axial direction relative to the combustor shell and accommodate a different expansion rate compared to the combustor shell.

The combustor 20 operates at extremely high temperatures during operation of the gas turbine engine 10. The combustor 20 includes a combustor shell 26 made from metallic materials, a heat shield 28 made from ceramic matrix composite materials, and a combustor liner 30 made from ceramic matrix composite materials as shown in FIG. 2. The combustor shell 26 is mounted within the gas turbine engine 10 upstream of the turbine 22 and is formed to define an interior cavity 32. The heat shield 28 is coupled to the combustor shell 26 and is configured to block hot gases from coming into contact with portions of the combustor shell 26. The combustor liner 30 extends circumferentially around the central reference axis 25 and defines a combustion chamber 34 within the interior cavity 32.

Combustion of fuel and gases occurs in the combustion chamber 34 and produces the hot gases which, absent the heat shield 28 and the combustor liner 30, may damage the combustor shell 26. The ceramic matrix composite materials forming the heat shield 28 and the combustor liner 30 are able to withstand much higher temperatures as compared to the metallic materials forming the combustor shell 26. As such, the heat shield 28 and the combustor liner 30 are arranged along inner surfaces of the combustor shell 26 defining the interior cavity to form the combustion chamber 34 and block the hot gases from reaching the combustor shell 26.

The combustor shell 26 includes an outer wall 36, an inner wall 38 spaced apart from the outer wall 36, and a dome panel 40 (sometimes called a meter panel) as shown in FIG. 2. The outer wall 36 is annular and extends circumferentially around the central reference axis 25. The inner wall 38 is annular and arranged radially inward from the outer wall 36 to provide the interior cavity 32 between the outer wall 36 and the inner wall 38. The dome panel 40 is coupled to an axially-forward end 42, 44 of the outer wall 36 and the inner wall 38.

The dome panel 40 is formed to include a plurality of fuel nozzle apertures 46 that open into the interior cavity 32. Fuel nozzles 48 (also called burners) extend through the fuel nozzle apertures 46 and in or adjacent to the combustion chamber 34 to ignite the fuel and air flowing therethrough. The hot gases produced by the combustion process flow aft through the combustion chamber 34 until they exit the combustion chamber 34 toward the turbine 22.

The heat shield 28 is coupled to an axially-aft surface 50 of the dome panel 40 and arranged within the interior cavity 32 as shown in FIG. 2. The heat shield 28 is configured to block the hot gases from reaching the dome panel 40 of the combustion shell 26. In the illustrative embodiment, the heat shield 28 is configured to radially locate the combustor liner 30 relative to the combustion shell 26.

Figure 3:
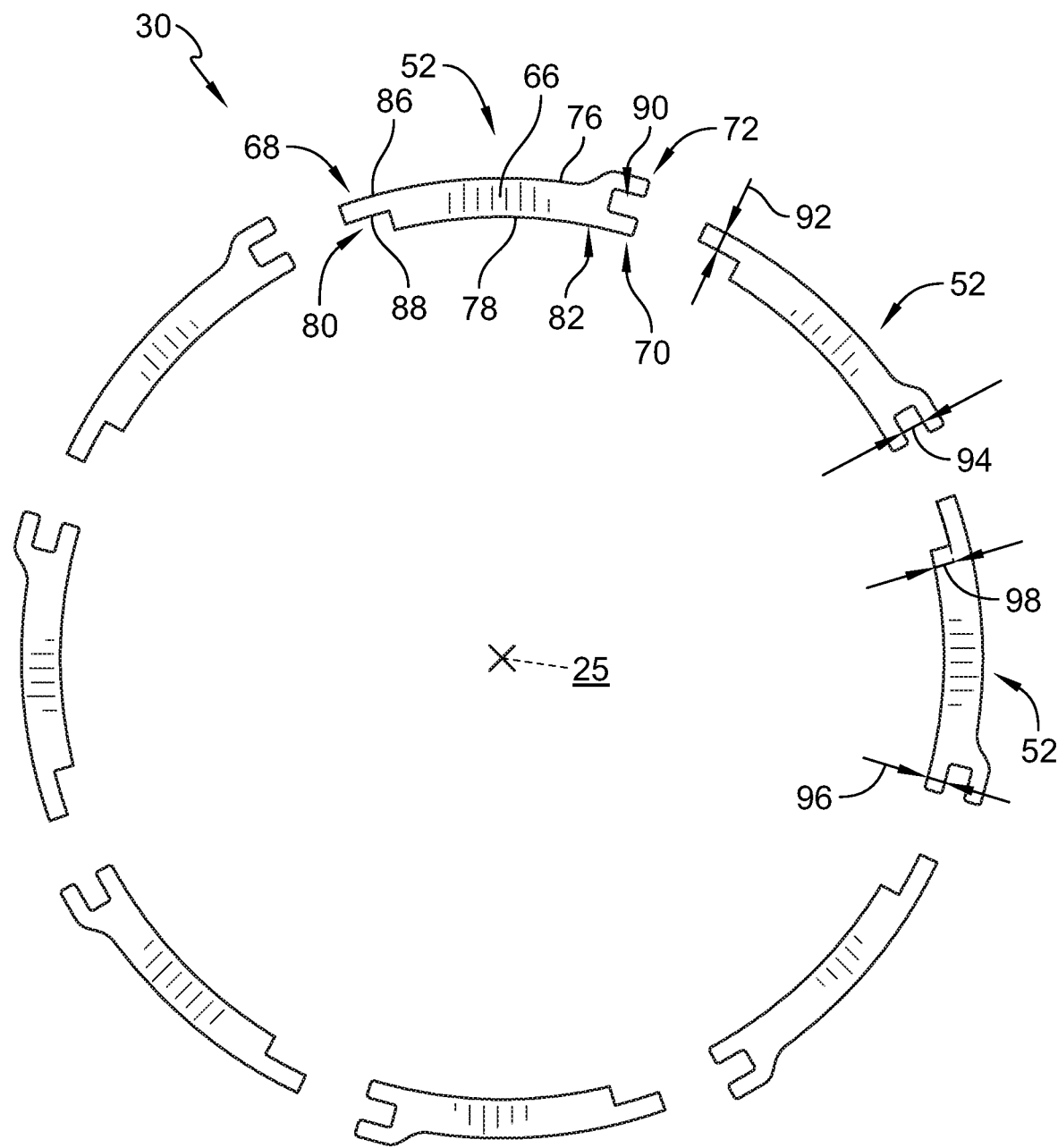
FIG. 3 is an exploded aft-looking elevation view of the combustor liner of FIG. 2 showing that the combustor liner includes a plurality of liner segments arranged circumferentially about the central reference axis and showing that each liner segment includes a first circumferential prong arranged along a first circumferential end of each liner segment and a pair of second circumferential prongs arranged along a second circumferential end of each liner segment for attachment with the first circumferential prong of an adjacent liner segment to form a radial boundary of the combustion chamber.

The combustor liner 30 includes a plurality of liner segments 52 arranged circumferentially adjacent one another around the central reference axis 25 in the interior cavity 32 as shown in FIGS. 2 and 3. The plurality of liner segments 52 cooperate with one another to provide a radial boundary of the combustion chamber 34 within the interior cavity 32. Each liner segment 52 has an axially forward end 54 trapped radially between the combustor shell 26 and the heat shield 28 to establish a radial location of the axially forward end 54. Each liner segment 52 is formed in one piece without any machined holes extending therethrough so that structural integrity of the liner segments 52 is not compromised.

During operation of the gas turbine engine 10, the combustor liner 26 may grow due to thermal expansion at a greater rate compared to the heat shield 28 and the combustor liner 30. Each liner segment 52 is located radially by the heat shield 28 without any axial fixation of the axially forward end 54 so that each liner segment 52 floats relative to the combustor shell 26. This allows axial movement of each liner segment 52 relative to the combustor shell 26 and the heat shield 28 thereby accommodating thermal growth of each liner segment 52 at a rate not equal to the combustor shell 26.

The combustor liner 30 is sized so that each of the liner segments 52 is retained in radially-fixed position as the combustor shell 26 grows thermally at a different rate. The combustor shell further includes an aft hanger 56 coupled to an inner surface of the combustor shell 26. The aft hanger 56 extends into the interior cavity 32 and has a ledge 58 that engages an axially aft end 60 of each tile segment to block each tile segment from moving radially into the combustion chamber 34. The ledge 58 is sized selectively to allow the combustion shell 26 to grow thermally and increase a length of the combustion chamber 34 while still retaining each tile segment 52 in a floating relationship to the combustion shell 26. Floating the liner segments 52 relative to the combustor shell 26 prevents binding stresses from forming in the liner segments 52 due to the combustor shell 26 expanding at a higher rate compared to the liner segments 52.

Each liner segment 52 has a first axial length 62 between the axially-forward end 54 and the axially-aft end 60 as shown in FIG. 2. The combustion chamber 34 has an axial length that is substantially equal to the length 62 of each liner segment 64. Accordingly, each of the tile segments 52 extends across the entire axial length of the combustion chamber 34.

In the illustrative embodiment, the outer wall 36 and the inner wall 38 are both lined with tile segments 52, 53 as shown in FIG. 2. The tile segments 52 lining the outer wall 36 have a concave shape when viewed in the axial direction relative to the central reference axis 25. The tile segments 53 lining the inner wall 38 have a convex shape when viewed in the axial direction relative to the central reference axis 25. Additionally, the tile segments 53 lining the inner wall 38 curve outwardly away from the central reference axis 25 so that the combustion chamber 34 narrows as the tile segments 53 extend aft toward the turbine 22. Other than the shape of the tile segments 52 lining the outer wall 36 compared to the shape of the tile segments 53 lining the inner wall 38, the tile segments 52, 53 are substantially the same. Accordingly, only the tile segments 52 lining the outer wall 36 are described herein and their description is incorporated by reference for the tile segments 53 lining the inner wall 38.

Each tile segment 52 includes a tile body 66, a first circumferential prong 68, a pair of second circumferential prongs 70, 72, and an aft prong 74 as shown in FIGS. 2 and 3. The tile body 66 has an outer radial surface 76 and an inner radial surface 78 opposite the outer radial surface 76. The first circumferential prong 68 is arranged along a first circumferential side 80 of the tile body 66 and extends circumferentially away from the tile body 66. Both second circumferential prongs 70, 72 are arranged along a second circumferential side 82 of the tile body 66 and extend circumferentially away from the tile body 66 in a direction opposite the first circumferential prong 68. The aft prong 74 provides the axially aft end 60 of each tile segment 52 and extends aft away from the tile body 66. The aft prong 74 has an inner radial surface 84 offset from the inner radial surface 78 of the tile body 66 and engaged with the ledge 58 of the aft hanger 56.

The first circumferential prong 68 is sized relative to the second circumferential prongs 70, 72 so that each tile segment 52 couples to one another in a ship-lapped manner as suggested in FIG. 3. The first circumferential prong 68 has an outer radial surface 86 that is flush with the outer radial surface 76 of the tile body 66 and an inner radial surface 88 offset from the inner radial surface 78 of the tile body 66. The pair of second circumferential prongs 70, 72 includes an outer prong 70 and an inner prong 72 spaced apart from the outer prong 70 to provide an axially-extending channel 90 radially between the outer prong 70 and the inner prong 72. The first circumferential prong 68 has a radial thickness 92 that is equal to a distance 94 between the inner prong 72 and the outer prong 70 defining the axially-extending channel 90.

When combined the first circumferential prong 68 of each tile segment 52 extends into an axially-extending channel 90 of a neighboring tile segment 52 to couple the tile segments 52 together and form an annular hoop combustor liner 30 as suggested in FIG. 3. The inner prong 72 has a radial thickness 96 equal to a distance 98 between the inner radial surface 78 of the tile body 66 and the inner radial surface 88 of the first circumferential prong 68. Thus, the inner radial surface 78 of the tile body 68 of each liner segment 52 is flush with one another when combined to form the combustor liner 30.

In the illustrative embodiment, the combustor shell 26 is formed to include a plurality of cooling holes 100 that open into a cooling cavity 102 formed between each tile segment 52 and the combustor shell 26 as shown in FIG. 2. Cooling fluid is configured to flow into the cooling cavity 102 and cause a pressure differential between the cooling cavity 102 and the combustion chamber 34 that forces each tile segment 52 into engagement with the heat shield 28 and the ledge 58. The cooling fluid may also cool the tile segments 52. The pressure differential between the cooling cavity 102 and the combustion chamber 34 maintains the combustor liner 30 in a radially fixed position relative to the combustor shell 26 subject to the thermal growth difference of the combustor shell 26. The cooling fluid flows aft through the cooling cavity 102 and exits the cooling cavity through an exit aperture 104 where it may be directed downstream and used elsewhere in the gas turbine engine. In accordance with the present disclosure, the number of cooling holes and an amount of cooling fluid is minimized by using the combustor liner 30 described herein. This improves the strength of the components forming the combustor 20 and improves efficiencies of the gas turbine engine 10.

The ceramic matrix composite materials in the illustrative embodiment comprise silicon carbide fibers suspended in a silicon carbide matrix, however, any suitable ceramic matrix composite composition may be used. The heat shield 28 and the combustor liner 30 are made from silicon carbide fiber preforms that are infiltrated with ceramic matrix material. The fiber preforms may be a two-dimensional ply preform or a three-dimensionally woven or braided preform. Prior to infiltration, the preforms may be molded into a desired shape. Once molded into the desired shape, the fiber preforms are infiltrated with ceramic matrix material by chemical vapor infiltration. The fiber preforms may be also be processed through slurry infiltration, melt infiltration and/or polymer infiltration and pyrolysis. Once densified, the finished ceramic matrix composite component may be machined to finalize the desired shape.

In some embodiments, the combustor 20 in a gas turbine engine 10 operates at extremely high temperatures and, thus, challenges the capabilities of metallic alloys that can be used to form the combustion chamber. SiC—SiC ceramic matrix composite (CMC) materials offer a higher temperature option to deal with this extreme environment. In addition, as environmental regulations on gas turbine emissions become increasingly stringent over time, a greater fraction of the air entering the combustor must be used for emissions control/reduction features in order to have a compliant engine design. As such, a smaller fraction of air will be available for adequate wall cooling in future combustors. Higher temperature-capable CMC material may offer the capability of using less of the combustor air for cooling the structure. One location that may benefit from such a material change is the combustor inner flow path.

In some embodiments, one aspect of making the CMC combustor liner work is to manage thermal stress and allow for movement relative to the adjacent components and support structure. The primary embodiment (FIG. 2) in accordance with the present disclosure is a CMC combustor liner cassette that can run the entire axial length of the combustion chamber. The liner is split circumferentially in a number of places. The number of cassetes needed to form the outer (or inner) liner will likely be driven by the thermal distortions of the CMC and the support structure to reduce thermally induced stresses.

In some embodiments, along the split lines of each CMC cassette, a ship lap or tongue-in-groove feature may be provided to discourage flow from leaking between the cassettes as suggested in FIG. 3. On the aft end of the combustion chamber is where each cassette is retained by the cold skin. On the forward end, the cassette would fit in a groove between the skin or shell 26 and heat shield 28, or a groove in the skin/dome panel. The groove would be sufficient in depth such that CMC cassette liner would not fall into the combustion chamber under the worst case thermal movements. Curvature of the CMC cassettes may need to be cylindrical or constant curvature so the cassette can be installed into the combustion assembly. Finally, the exterior skin may have holes that would provide backside cooling to the CMC cassettes. An axially aligned hole is shown in FIG. 2 at the aft end of the skin to provide a determined exit for the cooling air.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A combustor for use in a gas turbine engine, the combustor comprising
 a combustor shell comprising metallic materials adapted to be mounted in the gas turbine engine and formed to define an interior cavity, the combustor shell including an outer annular wall that extends circumferentially around a central reference axis, an inner annular wall arranged radially inward from the outer annular wall to provide the interior cavity between the outer annular wall and the inner annular wall, and a dome panel coupled to an axially forward end of the outer annular wall and the inner annular wall,
 a heat shield coupled to an axially aft surface of the dome panel and arranged within the interior cavity, and
 a combustor liner including a plurality of liner segments comprising ceramic matrix composite materials and arranged circumferentially adjacent one another around the central reference axis in the interior cavity to provide a radial boundary of a combustion chamber within the interior cavity, wherein each liner segment has an axially forward end trapped radially between the combustor shell and the heat shield to establish a radial location of the axially forward end without axial fixation of the axially forward end so as to allow floating axial movement of each liner segment relative to the combustor shell and the heat shield thereby accommodating thermal growth of each liner segment at a rate not equal to the combustor shell,
 wherein each liner segment includes an aft prong at an axially aft end of each liner segment that is interlocked with a ledge of the combustor shell to establish a radial location of the axially aft end of each liner segment without axial fixation of the axially aft end of each liner segment so as to allow the floating axial movement of each entire liner segment relative to the combustor shell and accommodate the thermal growth of each liner segment,
 wherein each liner segment includes a tile body, a first circumferential prong arranged along a first circumferential side of the tile body, and a pair of second circumferential prongs arranged along a second circumferential side of the tile body,
 wherein the tile body has an outer radial surface and an inner radial surface and the first circumferential prong is defined by: (i) an outer radial surface that is flush with the outer radial surface of the tile body and (ii) an inner radial surface offset from the inner radial surface of the tile body,
 wherein the pair of second circumferential prongs includes an outer prong and an inner prong spaced apart from the outer prong to provide an axially extending channel radially between the outer prong and the inner prong, and
 wherein the outer radial surface of the tile body, aside from a protrusion adjacent the outer prong, is a smooth, even surface.

2. The combustor of claim 1, wherein each liner segment has an axial length between the axially forward end and the axially aft end, and the combustion chamber has an axial length that is substantially equal to the axial length of each liner segment.

3. The combustor of claim 2, wherein each liner segment includes the tile body and the aft prong that extends along an axially aft end of the tile body and that has an inner radial surface offset from the inner radial surface of the tile body and engaged with the ledge of the aft hanger.

4. The combustor of claim 1, wherein the first circumferential prong has a radial thickness that is equal to a distance between an outer radial surface of the inner prong and an inner radial surface of the outer prong defining the axially extending channel.

5. The combustor of claim 4, wherein the inner prong has a radial thickness equal to a distance between the inner radial surface of the tile body and the inner radial surface of the first circumferential prong so that the inner radial surface of the tile body of each liner segment is flush with one another when combined to form the combustor liner.

6. The combustor of claim 1, wherein the combustor shell is formed to include a plurality of cooling holes that open into a cooling cavity formed between each liner segment and the combustor shell and cooling fluid is configured to flow into the cooling cavity and cause a pressure differential between the cooling cavity and the combustion chamber that forces each liner segment into engagement with the heat shield.

7. A combustor for use in a gas turbine engine comprising
a combustor shell comprising metallic materials and formed to define an interior cavity, the combustor shell including an outer annular wall and a dome panel coupled to an axially forward end of the outer annular wall,
a heat shield coupled to an axially aft surface of the dome panel, and
a combustor liner including a plurality of liner segments comprising ceramic matrix composite materials and arranged circumferentially adjacent one another around an axis to provide a radial boundary of a combustion chamber, wherein each liner segment has an axially forward end positioned radially between the combustor shell and the heat shield to establish a radial location of the axially forward end without axial fixation of each liner segment so as to allow axial movement of each liner segment relative to the combustor shell and the heat shield thereby accommodating thermal growth of each liner segment at a rate not equal to the combustor shell,
wherein the combustor shell further includes an aft hanger that extends into the interior cavity to provide a ledge that supports an axially aft end of each liner segment so as to allow each entire liner segment to float relative to the combustor shell,
wherein each liner segment includes a tile body, a first circumferential prong arranged along a first circumferential side of the tile body, and a pair of second circumferential prongs arranged along a second circumferential side of the tile body,
wherein the tile body has an outer radial surface and an inner radial surface and the first circumferential prong is defined by: (i) an outer radial surface that is flush with the outer radial surface of the tile body and (ii) an inner radial surface offset from the inner radial surface of the tile body,
wherein the pair of second circumferential prongs includes an outer prong and an inner prong spaced apart from the outer prong to provide an axially extending channel radially between the outer prong and the inner prong, and
wherein the outer radial surface of the tile body, aside from a protrusion adjacent the outer prong, is a smooth, even surface.

8. The combustor of claim 7, wherein each liner segment has an axial length between the axially forward end and the axially aft end of each liner segment and the combustion chamber has an axial length that is substantially equal to the axial length of each liner segment.

9. The combustor of claim 8, wherein the combustor shell further includes the aft hanger that is coupled to an inner surface of the combustor shell and extends into the combustion chamber to provide the ledge that blocks each liner segment from moving radially into the combustion chamber, the ledge sized selectively to allow the combustion shell to grow thermally and increase the axial length of the combustion chamber while still retaining each liner segment.

10. The combustor of claim 9, wherein each liner segment includes a tile body and an aft prong that extends along an axially aft end of the tile body and that has an inner radial surface offset from the inner radial surface of the tile body and engaged with the ledge of the aft hanger.

11. The combustor of claim 7, wherein the first circumferential prong has a radial thickness that is equal to a distance between an outer radial surface of the inner prong and an inner radial surface of the outer prong defining the axially extending channel.

12. The combustor of claim 11, wherein the inner prong has a radial thickness equal to a distance between the inner radial surface of the tile body and the inner radial surface of the first circumferential prong so that the inner radial surface of the tile body of each liner segment is flush with one another when combined to form the combustor liner.

13. A combustor for use in a gas turbine engine comprising
a combustor shell comprising metallic materials and formed to define an interior cavity, the combustor shell including an outer annular wall and a dome panel coupled to an axially forward end of the outer annular wall,
a heat shield coupled to an axially aft surface of the dome panel, and
a combustor liner including a plurality of liner segments comprising ceramic matrix composite materials and arranged circumferentially adjacent one another around an axis to provide a radial boundary of a combustion chamber, wherein each liner segment has an axially forward end positioned radially between the combustor shell and the heat shield to establish a radial location of the axially forward end without axial fixation of the axially forward end so as to allow axial movement of each liner segment relative to the combustor shell and the heat shield thereby accommodating thermal growth of each liner segment at a rate not equal to the combustor shell,
wherein the outer wall of the combustor shell is formed to include a plurality of cooling holes that open into a cooling cavity formed between each liner segment and the outer wall and cooling fluid is configured to flow into the cooling cavity and cause a pressure differential between the cooling cavity and the combustion chamber that forces each liner segment into engagement with the heat shield,
wherein each liner segment has an axial length between the axially forward end and an axially aft end and the combustion chamber has an axial length that is substantially equal to the axial length of each liner segment, and
wherein an exit aperture is formed in an aft end of the combustor shell and the cooling fluid flows aft through the cooling cavity and exits the cooling cavity through the exit aperture,
wherein each liner segment includes a tile body, a first circumferential prong arranged along a first circumferential side of the tile body, and a pair of second circumferential prongs arranged along a second circumferential side of the tile body,
wherein the tile body has an outer radial surface and an inner radial surface and the first circumferential prong is defined by: (i) an outer radial surface that is flush with the outer radial surface of the tile body and (ii) an inner radial surface offset from the inner radial surface of the tile body,
wherein the pair of second circumferential prongs includes an outer prong and an inner prong spaced apart from the outer prong to provide an axially extending channel radially between the outer prong and the inner prong, and wherein the outer radial surface of the tile body, aside from a protrusion adjacent the outer prong, is a smooth, even surface.

14. The combustor of claim 13, wherein each liner segment is formed in one-piece without any machined holes extending radially therethrough.

\* \* \* \* \*